(12) United States Patent
Hattori

(10) Patent No.: US 7,975,220 B2
(45) Date of Patent: Jul. 5, 2011

(54) APPARATUS, PROGRAM PRODUCT AND METHOD FOR STRUCTURED DOCUMENT MANAGEMENT

(75) Inventor: Masakazu Hattori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 914 days.

(21) Appl. No.: 11/524,621

(22) Filed: Sep. 21, 2006

(65) Prior Publication Data

US 2007/0198559 A1 Aug. 23, 2007

(30) Foreign Application Priority Data

Feb. 22, 2006 (JP) ................................ 2006-045807

(51) Int. Cl.
*G06F 17/27* (2006.01)
(52) U.S. Cl. ........ 715/249; 715/234; 715/235; 715/236; 715/237; 715/238; 715/239; 715/240; 715/241; 715/242
(58) Field of Classification Search .......... 715/234–242, 715/249
See application file for complete search history.

(56) References Cited

U.S. PATENT DOCUMENTS

| | | | | |
|---|---|---|---|---|
| 5,467,472 | A * | 11/1995 | Williams et al. | 707/1 |
| 5,680,616 | A * | 10/1997 | Williams et al. | 707/103 R |
| 5,727,195 | A * | 3/1998 | Nakatsuyama | 707/1 |
| 5,913,214 | A * | 6/1999 | Madnick et al. | 707/10 |
| 6,249,788 | B1 * | 6/2001 | Ronstrom | 707/101 |
| 6,502,112 | B1 * | 12/2002 | Baisley | 715/210 |
| 2004/0060004 | A1 * | 3/2004 | Mani et al. | 715/513 |
| 2004/0073541 | A1 * | 4/2004 | Lindblad et al. | 707/3 |
| 2004/0103105 | A1 * | 5/2004 | Lindblad et al. | 707/100 |
| 2005/0060647 | A1 * | 3/2005 | Doan et al. | 715/514 |
| 2005/0203957 | A1 * | 9/2005 | Wang et al. | 707/104.1 |
| 2007/0168327 | A1 * | 7/2007 | Lindblad et al. | 707/2 |

FOREIGN PATENT DOCUMENTS

| | | |
|---|---|---|
| JP | 2000-057163 | 2/2000 |
| JP | 2001-034618 | 2/2001 |
| JP | 2005-190163 | 7/2005 |
| WO | WO 02/33589 | 4/2002 |

OTHER PUBLICATIONS

Diao, et al., "*Yfilter: Efficient and Scalable Filtering of XML Documents*", ICDE, 2002, 2 pps.
Avila-Campillo, et al., "*XMLTK: An XML Toolkit for Scalable SML Stream Processing*"; 2002, 13 pps.
Japanese Office Action dated Aug. 4, 2009 with English Translation from pp. 1-3 of corresponding Japanese Application No. 2006-045807.

* cited by examiner

*Primary Examiner* — Laurie Ries
*Assistant Examiner* — Andrew R Dyer
(74) *Attorney, Agent, or Firm* — Ohlandt, Greeley, Ruggiero & Perle, L.L.P.

(57) ABSTRACT

The structured document management apparatus includes a document data accepting unit that accepts input of structured document data having a hierarchical logic structure; a structure guide data storage unit that stores structure guide data which is a summary of hierarchical structure information of the structured document data; a structure stream converting unit that syntax-analyzes the accepted structured document data, and converts the structure information in the structured document data into structure stream data as one-dimensional sequence data using the structure guide data; and a structure stream data storage unit that stores the converted structure stream data.

13 Claims, 20 Drawing Sheets

FIG.16

| TOKEN | | Place 0 QUEUE | Place 1 QUEUE | Trans 0 OUTPUT |
|---|---|---|---|---|
| E0 | (G) 0 | {} | {} | |
| E1 | 1 | {} | {} | |
| E2 | 2 | {2} | {} | |
| E3 | 3 | {2} | {} | |
| E4 | 4 | {2} | {} | |
| E5 | 5 | {2} | {} | |
| E6 | 6 | {2} | {6} | <2> |
| E7 | 7 | {2} | {6} | |
| E8 | 5 | {2} | {6} | |
| E9 | 8 | {2} | {6} | |
| E10 | 9 | {2} | {6} | |
| E11 | 10 | {2} | {6} | |
| E12 | 11 | {2} | {6} | |
| E13 | 2 | {13} | {} | |
| E14 | 5 | {13} | {} | |
| E15 | 6 | {13} | {15} | <13> |
| E16 | 7 | {13} | {15} | |
| E17 | 8 | {13} | {15} | |
| E18 | 9 | {13} | {15} | |
| E19 | 3 | {13} | {15} | |
| E20 | 4 | {13} | {15} | |

FIG.17
Q2
//book [author [first and last]]
FIG.18
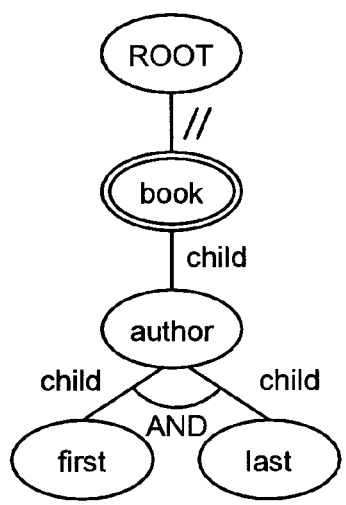
FIG.19
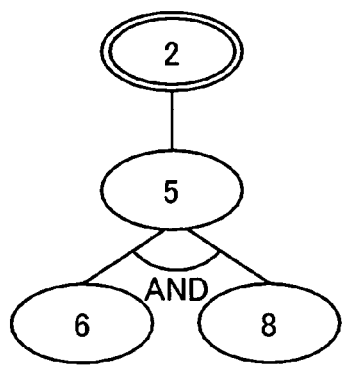

FIG.21

| TOKEN | | Place 0 QUEUE | Place 1 QUEUE | Place 2 QUEUE | Place 3 QUEUE | Trans 1 OUTPUT |
|---|---|---|---|---|---|---|
| E0 | (G) 0 | ⇔ | ⇔ | ⇔ | ⇔ | |
| E1 | 1 | ⇔ | ⇔ | ⇔ | ⇔ | |
| E2 | 2 | {2} | ⇔ | ⇔ | ⇔ | |
| E3 | 3 | {2} | ⇔ | ⇔ | ⇔ | |
| E4 | 4 | {2} | ⇔ | ⇔ | ⇔ | |
| E5 | 5 | {2} | ⇔ | ⇔ | ⇔ | |
| E6 | 6 | {2} | {6} | ⇔ | ⇔ | |
| E7 | 7 | {2} | {6} | ⇔ | ⇔ | |
| E8 | 5 | {2} | ⇔ | {9} | ⇔ | |
| E9 | 8 | {2} | ⇔ | {9} | ⇔ | |
| E10 | 9 | {2} | ⇔ | {9} | ⇔ | |
| E11 | 10 | {2} | ⇔ | {9} | ⇔ | |
| E12 | 11 | {2} | ⇔ | ⇔ | ⇔ | |
| E13 | 2 | {13} | ⇔ | ⇔ | ⇔ | |
| E14 | 5 | {13} | {15} | ⇔ | ⇔ | |
| E15 | 6 | {13} | {15} | ⇔ | ⇔ | |
| E16 | 7 | {13} | {15} | {17} | ⇔ | |
| E17 | 8 | {13} | {15} | {17} | ⇔ | <13> |
| E18 | 9 | {13} | {15} | {17} | {1} | |
| E19 | 3 | {13} | {15} | {17} | {1} | |
| E20 | 4 | {13} | {15} | {17} | {1} | |

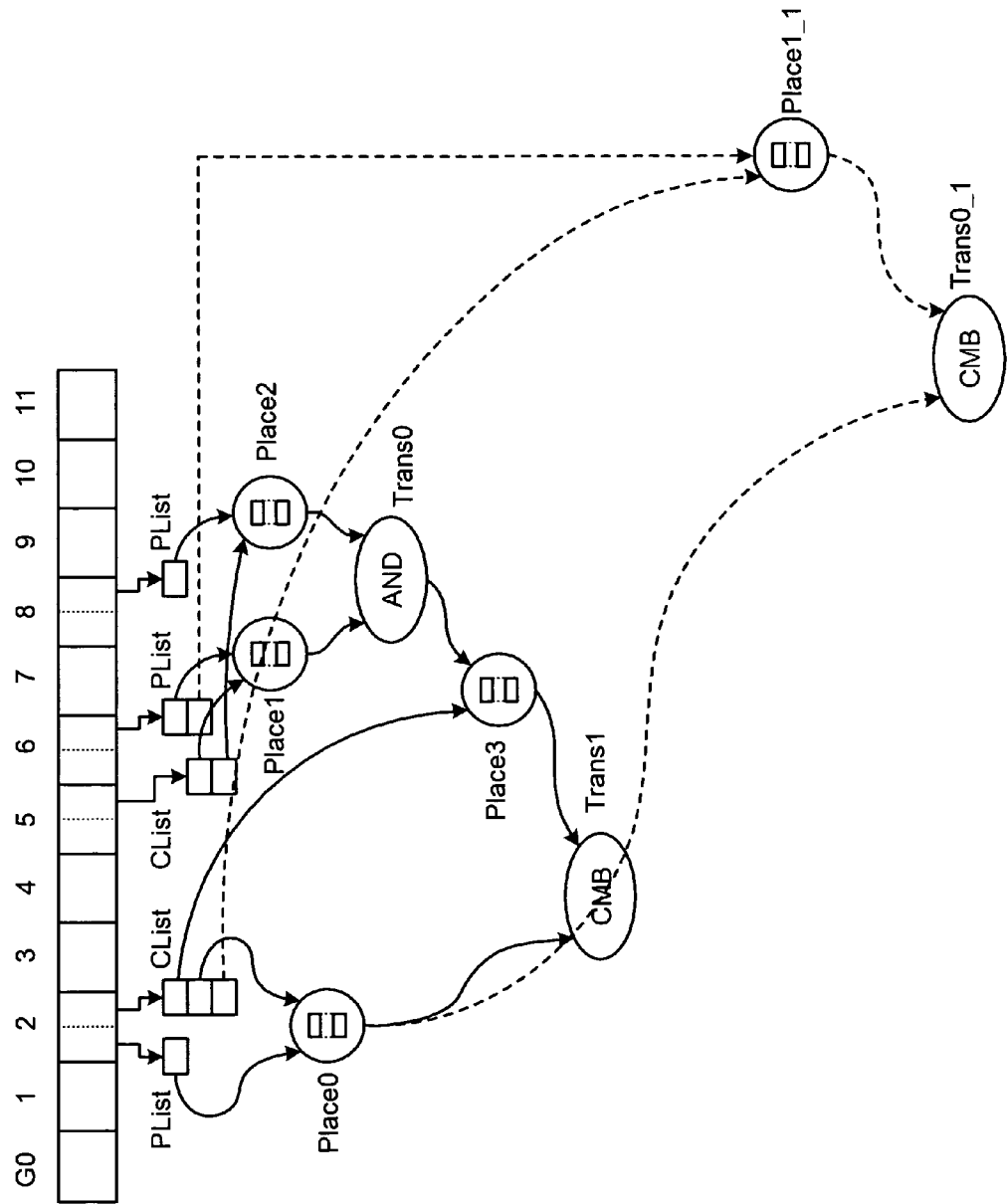

FIG.23

```
<books>
<book>
<title> XML DATABASE </title>
<author>
    <first> TARO </first>
</author>
<author>
    <last> YAMADA </last>
</author>
<publisher> A BOOKSTORE </publisher>
<info>
<isbn> ABX010101 </isbn>
<issueDate>
<year> 2002 </year>
<month> 12 </month>
<day> 20 </day>
</issueDate>
</info>
</book>
</books>
```

```
<?xml version="1.0"?>
<!DOCTYPE books [
<!ELEMENT books (book+) >
<!ELEMENT book (title,author+,info) >
<!ELEMENT info (isbn,issueDate) >
<!ELEMENT isbn (#PCDATA)>
<!ELEMENT issueDate (year,month,day) >
<!ELEMENT year (#PCDATA) >
<!ELEMENT month (#PCDATA) >
<!ELEMENT day (#PCDATA) >
]>
```

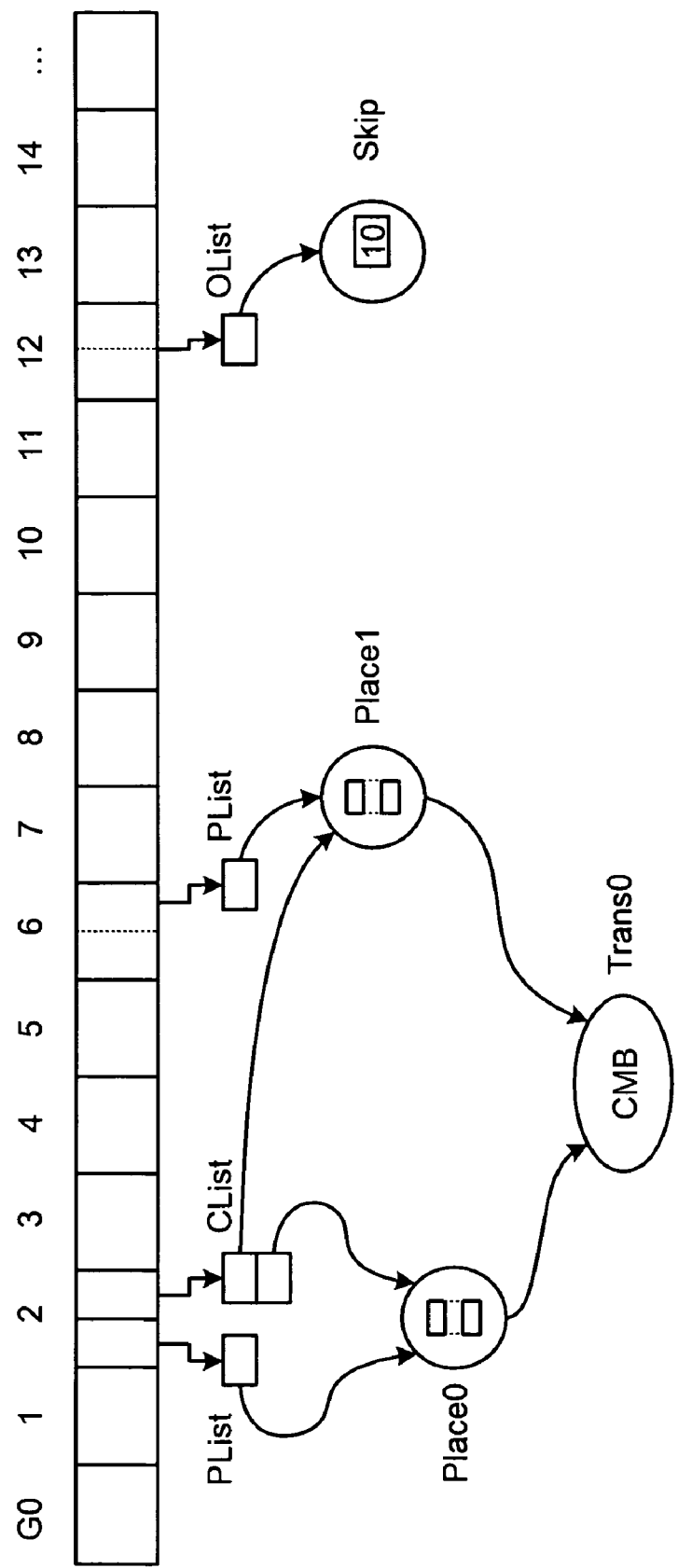

APPARATUS, PROGRAM PRODUCT AND METHOD FOR STRUCTURED DOCUMENT MANAGEMENT

CROSS-REFERENCE TO RELATED APPLICATIONS

This application is based upon and claims the benefit of priority from the prior Japanese Patent Application No. 2006-45807, filed on Feb. 22, 2006; the entire contents of which are incorporated herein by reference.

BACKGROUND OF THE INVENTION

1. Field of the Invention

The present invention relates to an apparatus, a program product and a method for structured document management that store and search for structured document data having a hierarchical logic structure.

2. Description of the Related Art

Some systems are considered as structured document management systems that store and search for structured document data described by XML (Extensible Markup Language) or the like.

The first system is a system that manages structured document data directly as a text file. The first system has a problem such that when the number and size of data become large, storage efficiency is deteriorated. Also, in the first system, a search utilizing the properties of the structured documents becomes difficult.

The second system is a system that manages structured document data in an RDB (Relational Database). The second system is widely used in backbone systems or the like.

The third system is a system that manages structured document data using an OODB (Object Oriented Database) which is developed for managing structured document data. The third system is, for example, an XML-compliant RDB where the RDB is extended.

Since the RDB stores data therein in a format of a flat table, complicated mapping which relates a hierarchical structure of XML data with a table is necessary. Due to the mapping, the performance is deteriorated if an advance structure (schema) relating to a table is not designed sufficiently.

In recent years, therefore, the fourth system which is an alternative to the first to third systems is proposed. The fourth system is a system that manages structured document data natively. In the fourth system, since XML data having various hierarchical structures are stored without executing a special mapping process, a special overhead is not preset at the time of storage and acquisition. Also, a costly advance schema design is not necessary, and thus the structure of the XML data can be changed freely according to a change in business environments.

Even when structured document data are stored efficiently, it does not make much sense if a means that fetches the stored data is not provided. As the means that fetches the stored data, a query language is used. As SQL (structured Query Language) is used in the RDB world, XQuery (XML Query Language) is established in XML. XQuery is a language for treating XML data like a database, and provides a means that fetches, aggregates and analyzes a data aggregate which matches to the predetermined conditions.

Since the XML data is described in a hierarchical structure where parentage and sibling elements are combined, a means that traces this hierarchical structure is provided. A technique for searching for structured document data including specific elements and a specific structure specified by search conditions while tracing the hierarchical structure of the structured document data stored in such a manner is disclosed, for example, in JP-A 2001-034618 and 2000-057163 (Kokai).

Since the XML data have the hierarchical structure where the parentage and sibling elements are combined, however, the storage efficiency is low.

As the structure of structured document data becomes larger, the number of structured document data stored in a database is larger or the search conditions are more complicated, it takes a longer time to execute the process for tracing between elements composing the hierarchical structures of the respective structured document data. When the number or size of structured document data becomes larger, the stored structured document data cannot be developed on a memory, and the most of them are stored in a secondary storage such as a hard disk.

Particularly, in the system that manages structured document data natively, the structured document data are stored with the hierarchical structure between the elements being unchanged. For this reason, the elements of the structured document data stored on the secondary storage should be frequently accessed in order to check whether a specified element or structure is present as the search condition. In the case of a complicated search condition, the elements are accessed more frequently.

That is, according to the hierarchical structure tracing means disclosed in JP-A 2001-034618 and 2000-057163 (Kokai), while the element data composing the hierarchical structures of the respective structured document data in the database are being traced, the structured document data having the element and structure specified by the search condition are searched for. For this reason, the search cannot be conducted at a high speed. Particularly, as the size of the structured document data is larger, the number of the structured document data to be searched for is larger or the query data (search condition) is more complicated, it is more difficult to heighten the speed of the search process. More concretely, such problems are as follows.

(1) In the case of complicated XQuery, the query includes a plurality of path patterns. When the plural path patterns are verified, traverse to one structured document occurs repeatedly. Particularly, in the case of treating the large size of the structured document data which cannot be on memory, disc I/O with respect to the same page occurs intermittently, and the performance is severely deteriorated.

(2) In the case of XPath which is the subset of XQuery, the performance is deteriorated at the time of high hit. That is, when most of the structured document aggregate is traversed, a lot of disc input/output (I/O) occurs.

As an idea of suppressing data scanning to the same structured document data, a technique of a structured document stream process is present. For example, the following references are included.

(Reference 1) Y. Diao, P. Fischer, and M. J. Franklin. YFilter: Efficient and Scalable Filtering of XML Documents. In The 18th International Conference of Data Engineering, San Jose, February 2002.

(Reference 2) I. Avila-Campillo, D. Raven, T. Green, A. Gupta, Y. Kadiyska, M. Onizuka, and D. Suciu. An XML Toolkit for Light-weight XML Stream Processing, 2002.

The process is for inquiring about Xpath or the like without storing not all the structured document data in a main storage. A system, which converts a plurality of path patterns appearing on plural XPaths into state transitions and processes them, is also proposed. Under present circumstances, however, the following problem arises.

(3) The performance is deteriorated notably on the XPath without high hit. Due to a back track base, an overhead for the CPU process is large. The inquiry process using indexes is difficult due to the property of the process.

As mentioned above, it is difficult to process a plurality of path patterns for the database which stores structured document data therein with minimum disc I/O and a small calculating amount.

SUMMARY OF THE INVENTION

According to one aspect of the present invention, a structured document management apparatus includes a document data accepting unit that accepts input of structured document data having a hierarchical logic structure; a structure guide data storage unit that stores structure guide data which is a summary of hierarchical structure information of the structured document data; a structure stream converting unit that syntax-analyzes the accepted structured document data, and converts the structure information in the structured document data into structure stream data as one-dimensional sequence data using the structure guide data; and a structure stream data storage unit that stores the converted structure stream data.

According to another aspect of the present invention, a computer program product having a computer readable medium including programmed instructions for managing a structured document, wherein the instructions, when executed by a computer, cause the computer to perform: accepting input of structured document data having a hierarchical logic structure; syntax-analyzing the structured document data, and converting structure information in the structured document data into structure stream data as one-dimensional sequence data using structure guide data which is a summary of hierarchical structure information of the structured document data; and storing the structure stream data in a structure stream data storage unit.

According to still another aspect of the present invention, a method of managing structured document includes accepting input of structured document data having a hierarchical logic structure; syntax-analyzing the structured document data, and converting structure information in the structured document data into structure stream data as one-dimensional sequence data using structure guide data which is a summary of hierarchical structure information of the structured document data; and storing the structure stream data in a structure stream data storage unit.

BRIEF DESCRIPTION OF THE DRAWINGS

FIG. 16 is a progress chart when the structure stream data shown in FIG. 6 is given to the path pattern processing table shown in FIG. 12;

FIG. 17 is an explanatory diagram illustrating one example of query data Q2 according to a second embodiment of the present invention;

FIG. 18 is a schematic diagram illustrating a primary structure graph with respect to the query data Q2;

FIG. 19 is a schematic diagram illustrating a secondary structure graph based on the primary structure graph of FIG. 18;

FIG. 21 is a progress chart when the structure stream data shown in FIG. 6 is given to the path pattern processing table shown in FIG. 20;

FIG. 22 is an explanatory diagram illustrating one example of the path pattern processing table for processing the query data Q1 and Q2 simultaneously according to a third embodiment of the present invention;

FIG. 23 is an explanatory diagram illustrating one example of structured document data accompanying advance structure information according to a fourth embodiment of the present invention; and FIG. 24 is an explanatory diagram illustrating one example of the path pattern processing table where a skipping procedure is set.

DETAILED DESCRIPTION OF THE INVENTION

The preferred embodiments of an apparatus, a program product and a method for structured document-management according to the present invention are explained in detail below with reference to the accompanying diagrams.

First Embodiment

A first embodiment of the present invention is explained with reference to FIGS. 1 to 16.

Figure 1:
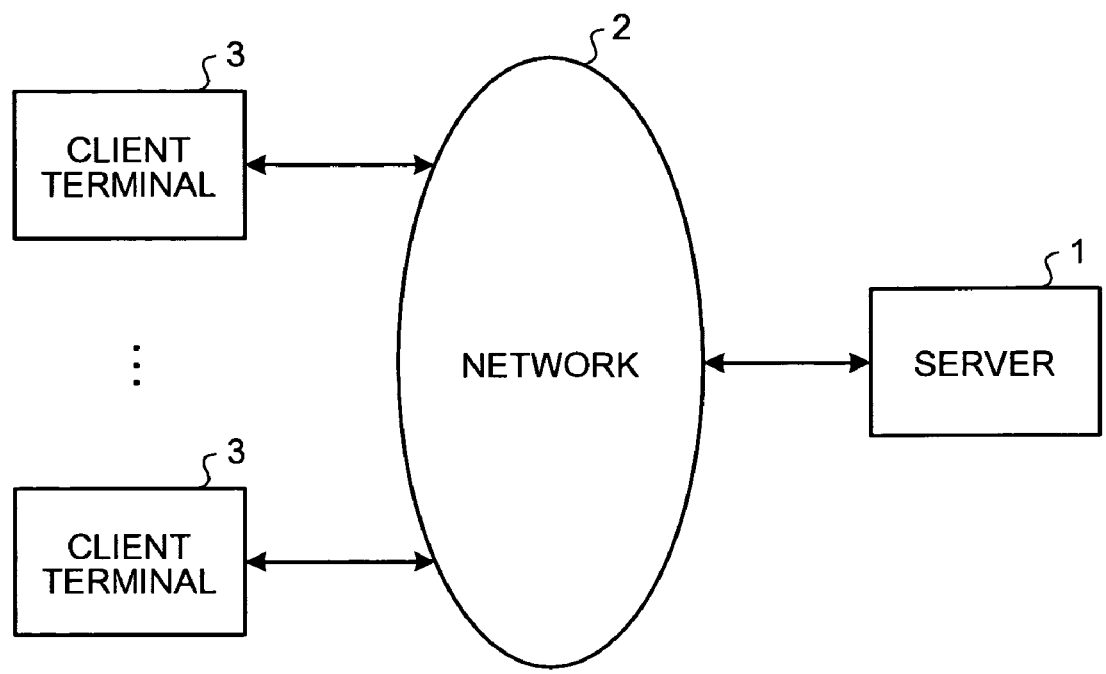
FIG. 1 is a schematic diagram illustrating a system constructing example of a structured document management system according to a first embodiment of the present invention.

FIG. 1 is a schematic diagram illustrating a system structuring example of the structured document management system according to the first embodiment. As shown in FIG. 1, a server client system is assumed as the structured document management system. In this system, a plurality of client computers (hereinafter, abbreviated as client terminals) 3 as structured document I/O devices are connected to a server computer (hereinafter, abbreviated as server) 1 as the structured document management apparatus via a network 2 such as LAN (Local Area Network) or the like.

Figure 2:
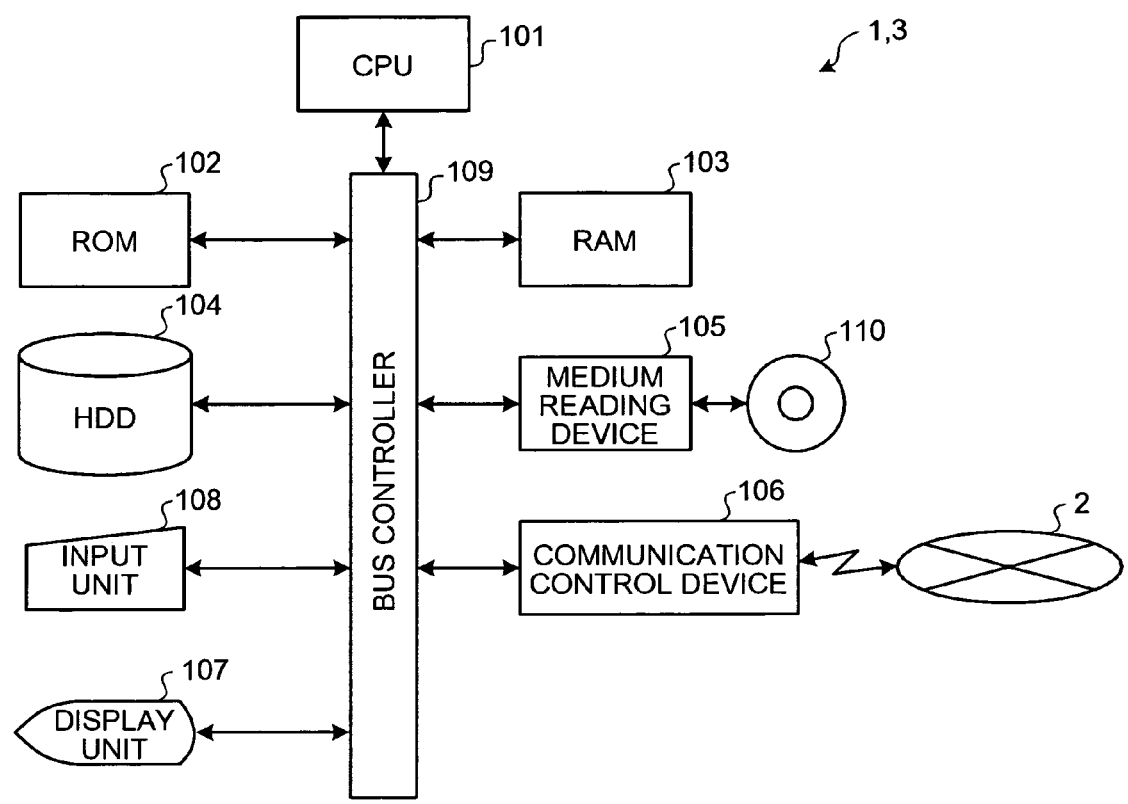
FIG. 2 is a module constructional diagram of a server and a client terminal.

FIG. 2 is a module constructional diagram of the server 1 and the client terminal 3. The server 1 and the client terminal 3 are, for example, general personal computers, respectively.

The server 1 and the client terminal 3 are each composed of a CPU (Central Processing Unit) 101, a ROM (Read Only Memory) 102, a RAM (Random Access Memory) 103, an HDD (Hard Disk Drive) 104, a medium drive device 105 such as a CD-ROM drive, a communication control device 106, a display unit 107, and an input unit 108 and the like. The CPU 101 executes an information processing. The ROM 102 is a read-only memory which stores BIOS or the like therein. The RAM 103 stores various data in a rewritable state. The HDD 104 functions as various databases and stores various programs therein. The medium drive device 105 stores information, distributes information to the outside and acquires information from the outside using a storage medium 110. The communication control device 106 transmits information using communication with another external computer via the network 2. The display unit 107 such as CRT (Cathode Ray Tube) and LCD (Liquid Crystal Display) displays a processing passage, a result and the like for an operator. The input unit 108 such as a keyboard and a mouse inputs a command, information and the like into the CPU 101 via the operator. A bus controller 109 mediates data transmitted/received between these units.

In the server 1 and the client-terminal 3, when a user powers on them, the CPU 101 actuates a loader program in the ROM 102, and reads a program called as OS (operating system) for managing hardware and software of a computer from the HDD 104 into the RAM 103, so as to actuate the OS. Such an OS actuates a program according to a user's operation, read and saves information. As typical OS, Windows (registered trademark), UNIX (registered trademark) and the like are known. An operation program which runs on OS is called as an application program. The application program is not limited to one which runs on predetermined OS, and thus it may be one for allowing OS to execute some of various processes, mentioned later, or one which is included as a part of a group of program files composing a predetermined application software and OS.

In the server 1, a structured document management program is stored as an application program in the HDD 104. That is, the HDD 104 serves as a storage medium which stores the structured document management program.

On the other hand, in the client terminal 3, a structured document I/O program is stored as an application program in the HDD 104. That is, the HDD 104 serves as a storage medium which stores the structured document I/O program.

In general, the application programs to be installed into the HDDs 104 of the server 1 and the client terminal 3 are recorded in the storage medium 110 including various optical discs such as CD-ROM and DVD, various magneto-optical discs, various magnetic discs such as flexible discs and various-types of media such as semiconductor memories. The operation programs recorded in the storage medium 110 are installed into the HDD 104. For this reason, the storage medium 110 having portability such as optical information recording media such as CD-ROM and magnetic media such as FD can be storage media in which the application program is stored. Further, the application program may be captured from the outside via the communication control device 106, for example, and installed into the HDD 104.

In the server 1, when the structured document management program which operates on OS is actuated, the CPU 101 executes various arithmetic processes so as to intensively control the respective units according to the structured document management program. On the other hand, in the client terminal 3, when the structured document I/O program which runs on OS is actuated, the CPU 101 executes various arithmetic processes so as to intensively control the respective units according to the structured document I/O program. Distinguishing process of the various arithmetic processes to be executed by the CPU 101 of the server 1 and the client terminal 3 are explained below.

Figure 3:
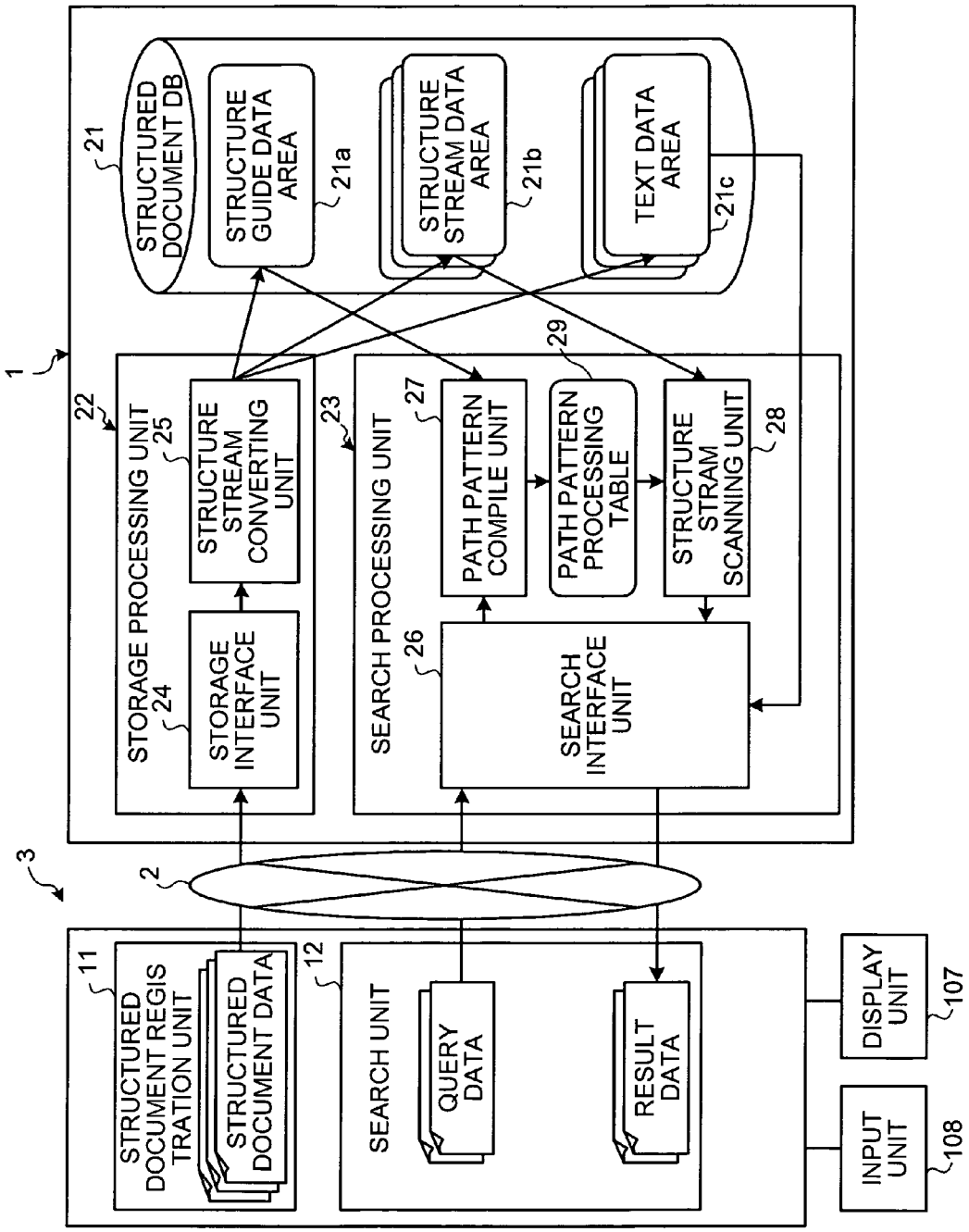
FIG. 3 is a block diagram illustrating a schematic construction of the server and the client terminal.

FIG. 3 is a block diagram illustrating a schematic construction of the server 1 and the client terminal 3. As shown in FIG. 3, the client terminal 3 has a structured document registration unit 11, and a search unit 12 according to the structured document I/O program.

The structured document registration unit 11 registers structured document data input from the input unit 108 and structured document data previously stored in the HDD 104 of the client terminal 3 in a structured document database (structured document DB) 21 of the server 1, mentioned later. The structured document registration unit 11 transmits a storage request together with the structured document data to be registered to the server 1.

Figure 4:
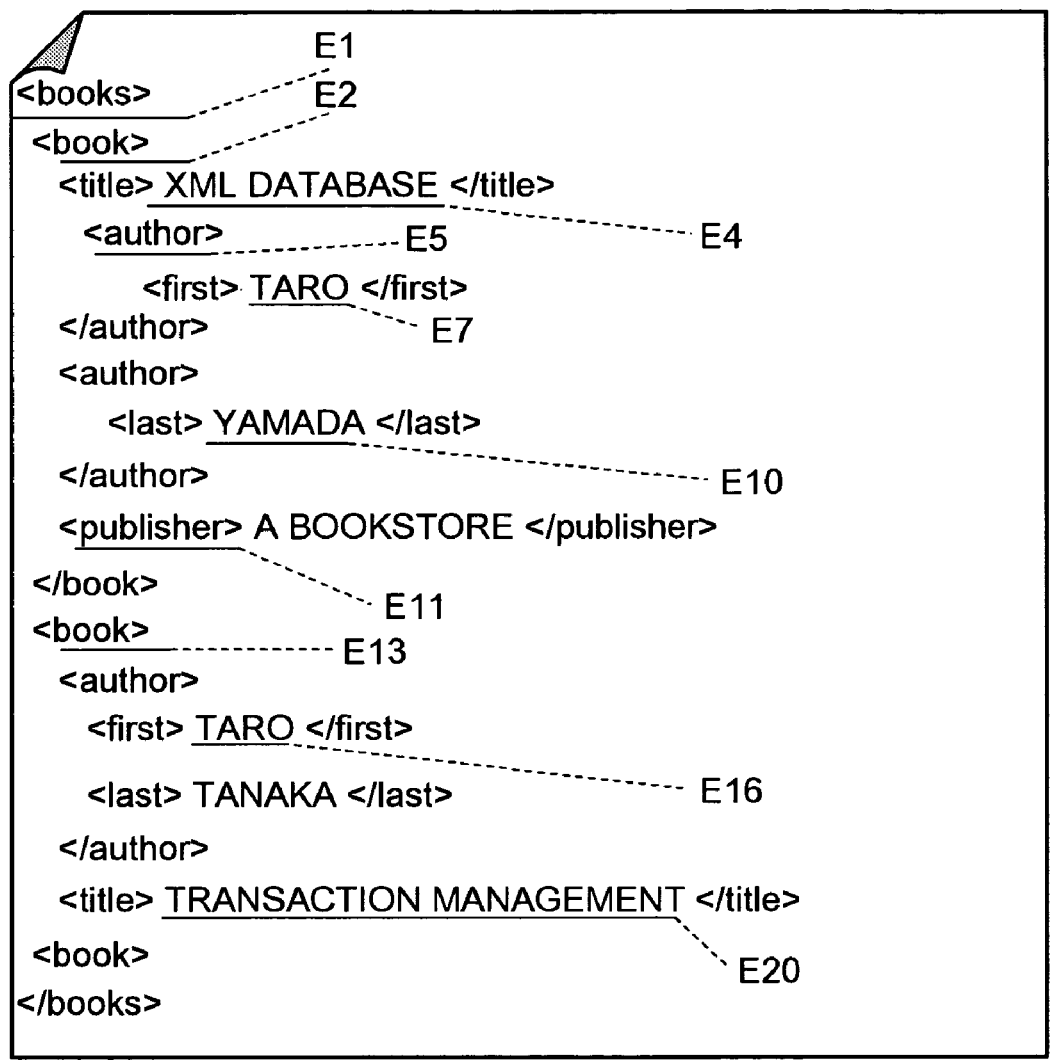
FIG. 4 is an explanatory diagram illustrating one example of structured document data.

Here, FIG. 4 illustrates one example of the structured document data. Typical language for describing the structured document data includes XML (Extensible Markup Language). The structured document data shown in FIG. 4 are described by using XML. As to XML, individual parts composing the document structure is called as "element", and the element is described by using a tag. Specifically, a tag showing the starting of the element (starting tag) and a tag showing the end of the element (end tag) sandwich data so that one element is expressed. The test data which are sandwiched by the starting tag and the end tag are a text element included in one element expressed by the starting tag and the end tag.

In the example of FIG. 4, a route element surrounded by tags <books> is present. The element "books" contains two sub-elements surrounded by the tag <book>. This <book> contains a plurality of sub-elements surrounded by tags <title> and <author>. The element <title> has a text element "XML database". The first <book> has two <author> elements, and the second <book> has one <author> element. As to the order of <title> and <author>, <title> appears first in the first <book>, and <author> appears first in the second <book>.

As shown in FIG. 4, the respective elements containing the text element are referred to by using element IDs, namely Ei (i=1 to 20).

The search unit 12 creates query data where search conditions or the like for searching the structured document DB 21 for desired data according to an instruction input by the user via the input unit 108. The search unit 12 transmits a search request containing the query data to the server 1. The search unit 12 receives result data corresponding to the search request transmitted from the server 1, and displays the result data on the display unit 107.

On the other hand, the server 1 has the structured document DB 21, a storage processing unit 22 and a search processing unit 23 according to the structured document management program.

The storage processing unit 22 accepts the storage request from the client terminal 3, and executes a process for storing the structured document data transmitted from the client terminal 3 in the structured document DB 21. The storage processing unit 22 is composed of a storage interface unit 24 and a structure stream converting unit 25.

The storage interface unit 24 accepts an input of the structured document data (document data accepting unit) and calls the structure stream converting unit 25 in order to store the structured document data.

The structured stream converting unit 25 functions as a structured stream converting means and syntax-analyzes the structured document data transmitted from the client terminal 3. The structured stream converting unit 25 refers to and updates the structure guide data in the structure guide data area 21a as a structure guide data storage unit of the structured document DB 21. The structure stream converting unit 25 then converts hierarchical structure information in the structured document data into structure stream data so as to store them in a structure stream data area 21b as a structured stream data storage unit of the structured document DB 21. Further, the structure stream converting unit 25 converts text information in the structured document data into text data so as to store them in a text data area 21c of the structured database DB 21.

Here, the structure guide data are the summary of the hierarchical structure information of entire structured document data aggregate stored in the system. The structure guide data has a hierarchical structure, and hold the following conditions.

(1) All paths which appear in the structured document data aggregate stored in the system appear in the structure guide data.

(2) All paths which appear in the structure guide data appear in the structured document data aggregate stored in the system.

(3) All the paths which appear in the structure guide data are unique.

Figure 5:
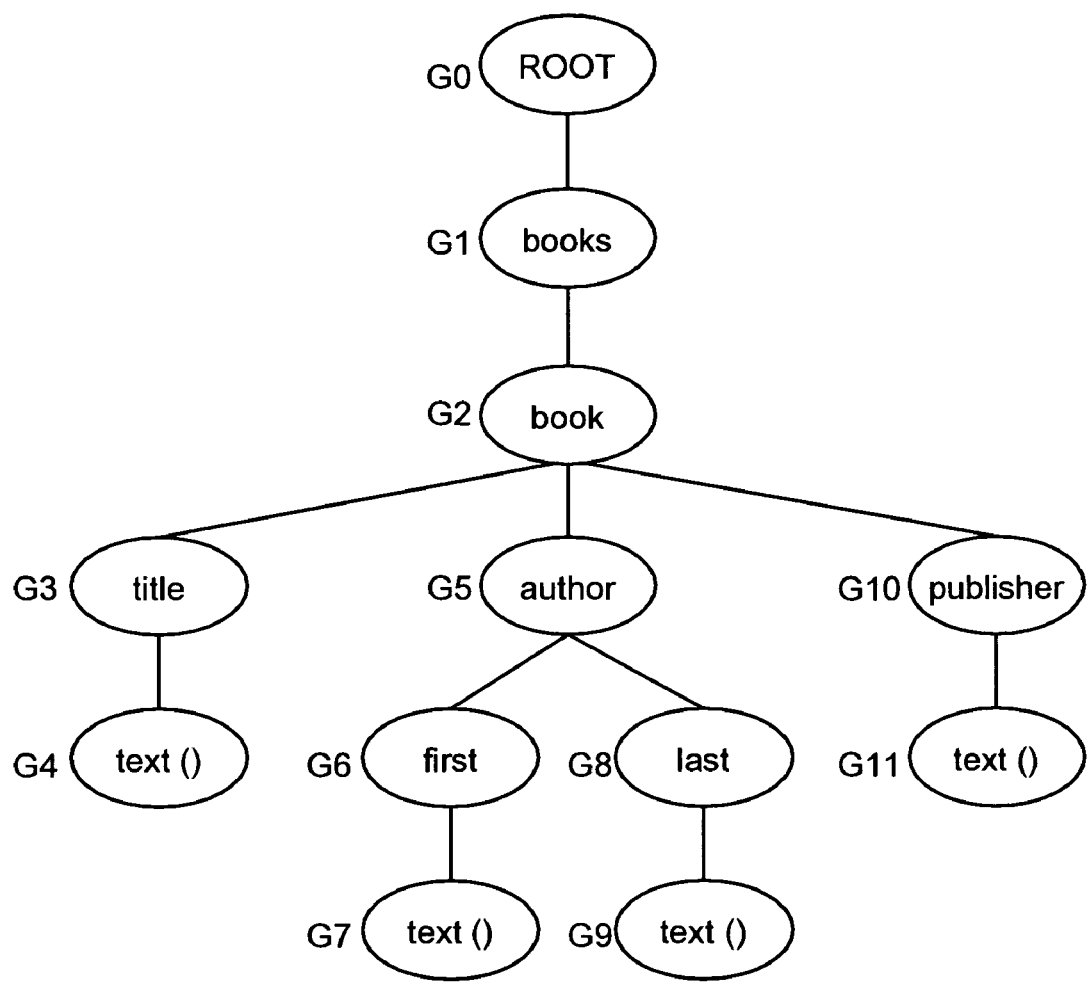
FIG. 5 is an explanatory diagram illustrating one example of structure guide data.

FIG. 5 is an explanatory diagram illustrating one example of the structure guide data. As a result of syntax-analyzing the structured document data shown in FIG. 4, the structure guide data are created. The structure guide data have a hierarchical structure composed of a plurality of guide nodes and arcs. Each of the guide nodes is provided with a tag name. An integrated tag name "text( )" is marked on the text element. A tag name "ROOT" is set for the guide node of the route. Unique IDs (GIDs) are allocated to the guide nodes, respectively, and IDs G0 to G11 are used. Every time when new structured document data are stored in the structured document DB 21, guide node aggregate which is not yet present is added to the structure guide data area 21a of the structured document DB 21, so that the structure guide data are updated increscent manner.

The structure stream data are arrangements in which GIDs are arranged, where the GIDs correspond to the document nodes passing when the route of the structured document data are traced by giving priority to depth.

Figure 6:
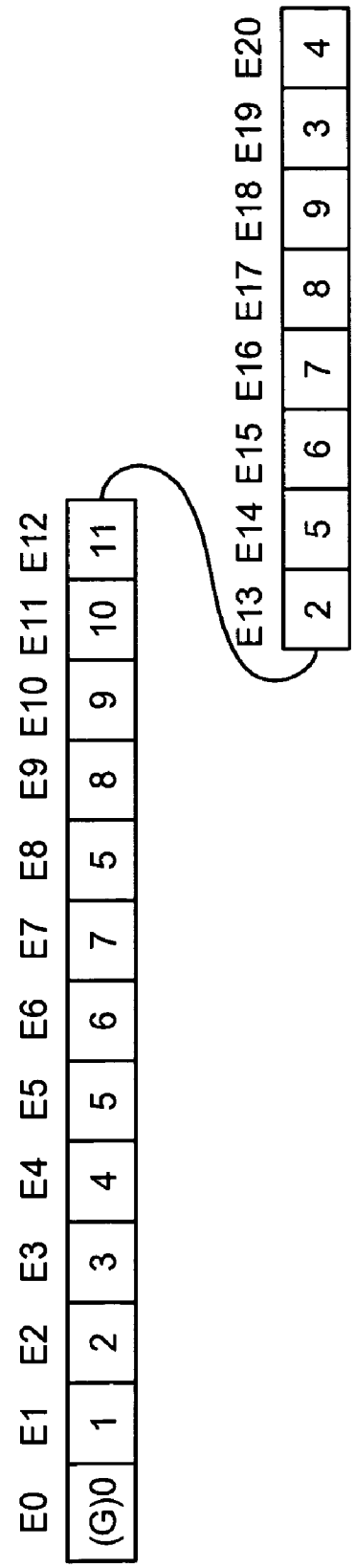
FIG. 6 is an explanatory diagram illustrating one example of structure stream data.

FIG. 6 is an explanatory diagram illustrating one example of the structure stream data. The example of the structure stream data is such that the structured document data of FIG. 4 are converted into sequence data by using the structure guide data shown in FIG. 5. Each sequence element is digitized by using GID.
E0 the sequence element corresponding to "ROOT" (G)0
E1 the sequence element corresponding to "books" (G)1
E2 the sequence element corresponding to "book" (G)2
. . .
. . .
When the structured document data are converted into the sequence data, namely, the structure stream, two-dimensional structured data can be treated as one-dimensional sequence data.

Figure 7:
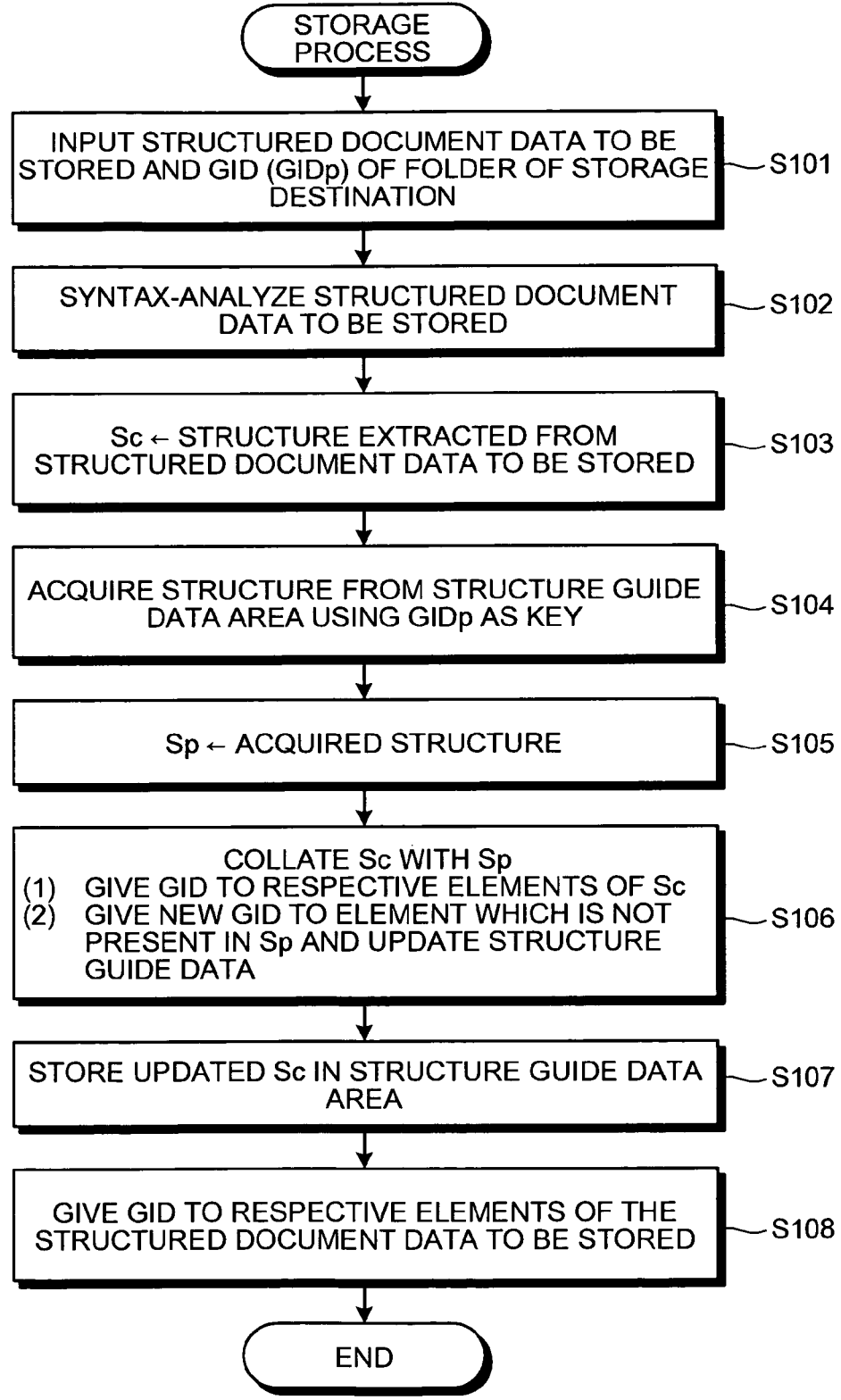
FIG. 7 is a flow chart illustrating a flow of an updating process for the structure guide data.

With reference to a flowchart shown in FIG. 7, the operation for updating the structure guide data by means of the structure stream converting unit 25 is explained.

The client terminal 3 transmits structured document data to be newly stored and a storage request message including GID of a folder as storage destination of the structured document data.

The client terminal 3 can acquire the GID of the folder as the storage destination in the following manner. The search unit 12 of the client terminal 3 has GUI (Graphic User interface) for displaying the schematic structure (see FIG. 5) of the structured document DB 21. When a user instructs about a desired guide node (folder) as a folder for storage destination from the structure displayed by GUI, inquiry data for acquiring GID corresponding to the guide node are created so as to be transmitted to the server 1. In the server 1, GID of the specified guide node is acquired from the inquiry data so as to be returned to the search unit 12 of the client terminal 3. The search unit 12 sends the acquired GID to the structured document registration unit 11.

The server 1 receives a storage request message including the structured document data to be newly stored and GIDp of the folder for storage destination (step S101).

The structured document data to be stored included in the storage request message is sent to the structure stream converting unit 25 of the storage processing unit 22 so as to be syntax-analyzed. As a result, a hierarchical structure composed of a plurality of object data of the structured document data is obtained, and is developed on the memory (step S102). That is, the structure stream converting unit 25 has a function corresponding to an XML parser which develops on DOM (Document Object Model)-format object data by executing the syntax analyzing process on the structured document data as the XML data.

Next, the structure stream converting unit 25 traces the route of the analyzed result, so as to extract the structure of the structured document data, namely, a plurality of nodes corresponding to the elements in the structured document data and a structure composed of the plural nodes. The structure of the structured document data is designated by Sc (step S103).

The structure stream converting unit 25 acquires the structure from the structure guide data area 21a using GID of the folder for storage destination as a key. The acquired GID is designated by GIDp. The structure stream converting unit 25 scans the structure guide data area 21a using GIDp as a key, so as to acquire a corresponding structure (step S104). The acquired structure is designated by Sp (step S105).

Thereafter, the structure stream converting unit 25 collates Sc with Sp (step S106). This is a simple matching of a tree. That is, when the structure element in Sp corresponding to the structure element in Sc is present, GID of the structure element in Sp is given to the structure element in Sc. When the structure element in Sp corresponding to the structure element in Sc is not present, new GID is given to a new element present in Sc, and the new element is added to Sp. Further, the new GID is give to the new element present in Sc. This operation is performed on all the structure elements in Sc.

Further, the structure stream converting unit 25 stores the updated Sp in the structure guide data area 21a (step S107). As a result, the structure guide data to be stored in the structure guide data area 21a are updated.

Finally, GID is given to each of the elements of the structured document data to be stored (step S108). That is, the timing at which GID is given to each of the elements of the structured document data to be stored is after the structure guide data area is updated.

The search processing unit 23 accepts a search request from the client terminal 3, and searches the structured document DB 21 for data matching the specified condition (query data) so as to return the searched data as result data. The search processing unit 23 is composed of a search interface unit 26, a path pattern compile unit 27 and a structure stream scanning unit 28.

The search interface unit 26 accepts an input of query data (query data accepting means), and calls the path pattern compile unit 27 and the structure stream scanning unit 28 in order to acquire the result data which satisfy the accepted query data.

The path pattern compile unit 27 functions as a path pattern compile means, syntax-analyzes query data aggregation transmitted from the client terminal 3, and refers to the structure guide data in the structure guide data area 21a of the structured document DB 21 so as to create a path pattern processing table 29 for specifying the processing order specialized for the query data.

Figure 8:
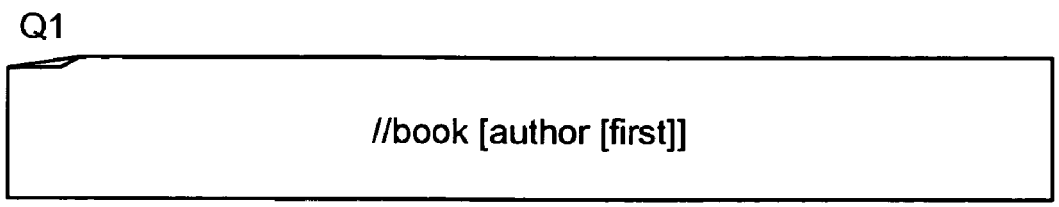
FIG. 8 is an explanatory diagram illustrating one example of query data.

FIG. 8 is an explanatory diagram illustrating one example of the query data. In XML, inquiry language called as XQuery (XML Query Language) proposed at W3C is present, and the query data are according to the inquiry describing method based on this language. FIG. 8 shows the following query data Q1.

Q1: A list of the structured document data "book" is returned. In the structured document data "book", the element "book" is present in a hierarchical tree of the structured document DB "ROOT", and the element "author" is present in the element "book", and the element "first" is present in the element "author".

The path pattern compile process in the path pattern compile unit 27 is explained with reference to a flowchart in FIG. 9.

Figure 10:
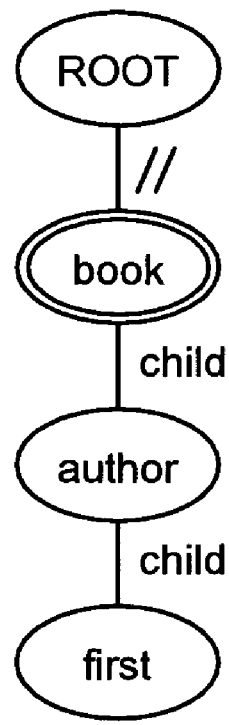
FIG. 10 is a schematic diagram illustrating a primary structure graph with respect to query data Q1.

A primary structure graph is created from the query data transmitted from the client terminal 3 (step S1). More concretely, the query data described by XQuery are syntax-analyzed, and a relationship between tags is expressed by a tree format. When the query data Q1 shown in FIG. 8 is considered, the primary structure graph shown in FIG. 10 is created. A relationship between "book" and "//(Descendant-or-Self)" is established using "ROOT" as a starting point. "book" is related with "author" and "child". In Q1 shown in FIG. 8, since a list of the structured document data "book" is returned, "book" is provided with a mark (double line) of an output node.

Then, the primary structure graph created at step S1 and the structure guide data are collated with each other, and a secondary structure graph is created (step S2). More concretely, the primary structure graph and the structure guide data are collated with each other, so that the secondary structure graph where unnecessary node is eliminated by converting them into GID is created. Here, the primary structure graph shown in FIG. 10 is considered. When GIDs corresponding to the respective nodes in the primary structure graph are calculated, the results are as follows.

"ROOT"→(G)0
"book"→(G)2
"author"→(G)5
"first"→(G)6

Further, unnecessary nodes are eliminated according to the following rules.

(1) Intermediate node other than the output node without accompanying AND condition G5
(2) Route node G0

Figure 11:
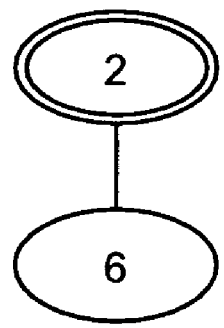
FIG. 11 is a schematic diagram illustrating a secondary structure graph based on the primary structure graph of FIG. 10.

As a result, the secondary structure graph shown in FIG. 11 is created.

Finally, the path pattern processing table 29 is created from the secondary structure graph created at step S2 (step S3).

Figure 12:
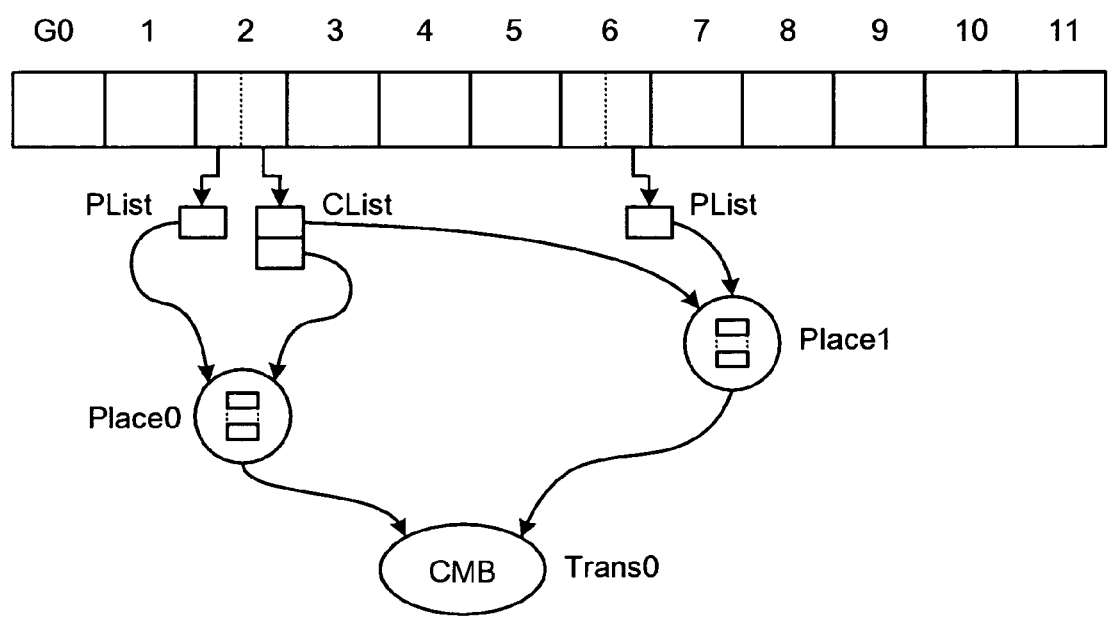
FIG. 12 is an explanatory diagram illustrating one example of a path pattern processing table with respect to the query data Q1.

FIG. 12 is an explanatory diagram illustrating one example of the path pattern processing table 29 with respect to the query data Q1 shown in FIG. 8. Such a path pattern processing table 29 is composed of the following elements.

(1) Entry Table

The table having the sequence elements corresponding to GIDs. GIDs are read sequentially starting from the head element of the structure stream data by the structure stream scanning process in the structure stream scanning unit 28. The positions of read GIDs are designated by EID. The procedures according to the read. GIDs are executed. The following two procedures are present.

(1.1) PList
EID (called as Token) is added (pushed) to Place.
(1.2) CList
Place is cleared.
(2) Place
This has a role of the storage area for holding queue of Token as intermediate data.
(3) Trans
This has a role to connect Place and Place, and allows Token held at high-order Place to flow to low-order Place. Detailed roles such as AND and CMB are given to Trans. Explanations about AND and CMB are as follows.
(3.1) AND
If Token is present in all the high-order Place aggregates, Token (True) is allowed to flow to the low-order Place.
(3.2) CMB
If Token is present in all the high-order Place aggregates, a combination of Tokens are allowed to flow (output).

Figure 9:
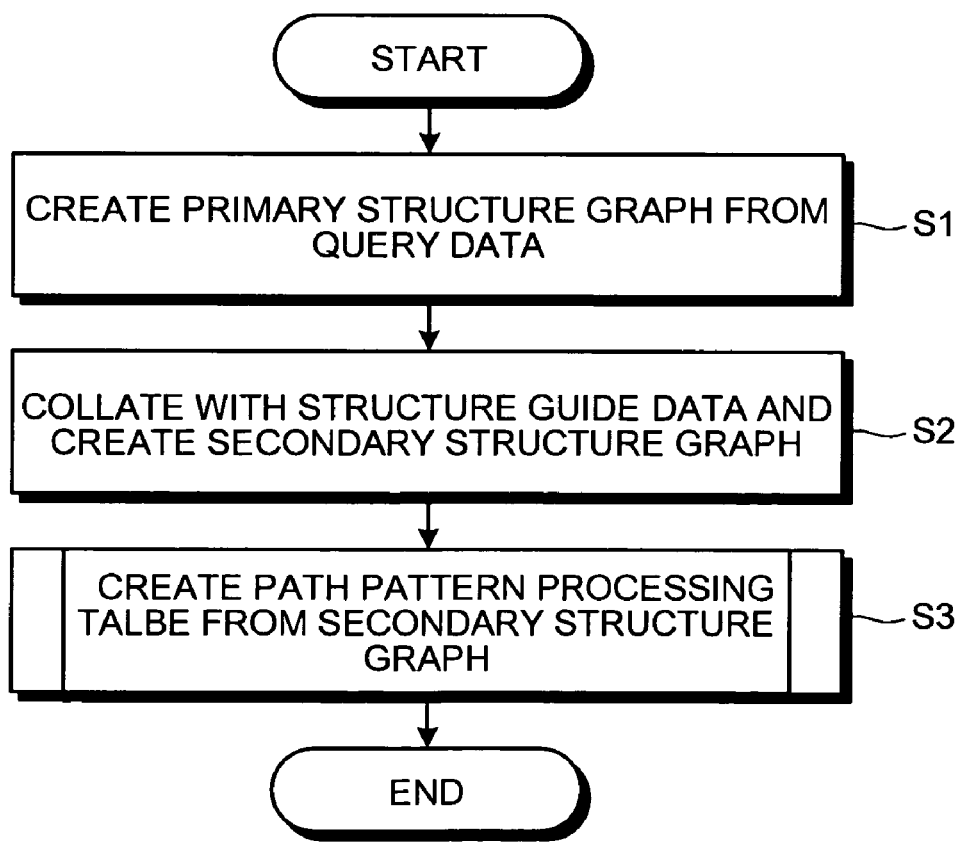
FIG. 9 is a flow chart schematically illustrating a flow of a path pattern compile process.
Figure 13:
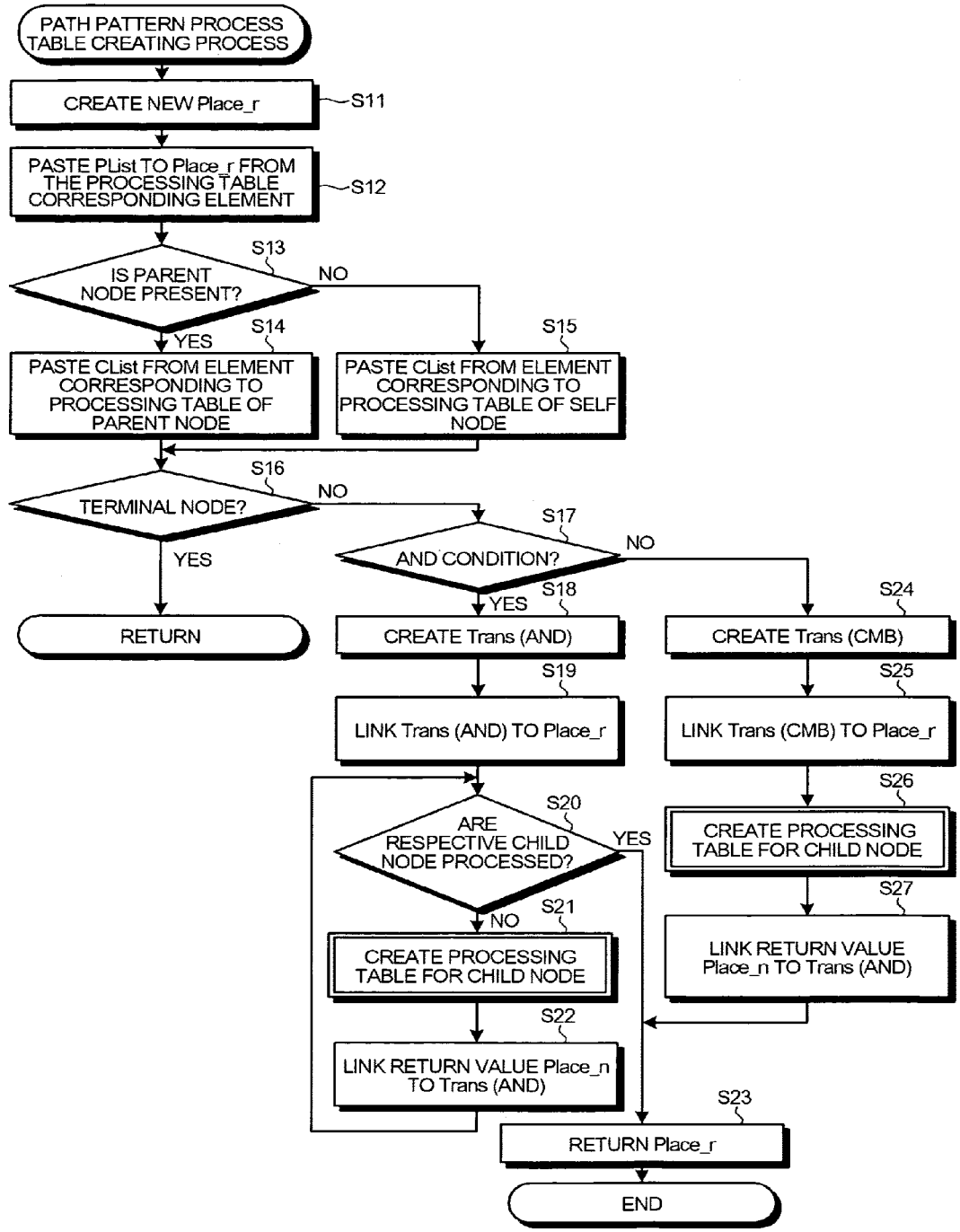
FIG. 13 is a flowchart illustrating a flow of a process for creating the path pattern processing table.

FIG. 13 is a flowchart illustrating a flow of the process for creating the path pattern processing table 29 (step S3 in FIG. 9).

First, Place_$_r$ is newly created (step S11), and Plist is pasted onto Place_r from the corresponding element of the processing table (step S12), and a determination is made whether a parent node is present (step S13). When the determination is made that the parent node is present (Yes at step S13), the sequence goes to step S14, and CList is pasted from the corresponding element of the processing table of the parent node. On the other hand, when the determination is made that the parent node is not present (No at step S13), the sequence goes to step S15 so that CList is pasted from the corresponding element of the processing table of the self node.

Thereafter, a determination is made whether the self node is a terminal node or not (step S16). When the determination is made whether the self node is the terminal node (Yes at step S16), the sequence returns to a calling source.

On the other hand, when the determination is made that the self node is not the terminal node (No at step S16), the sequence goes to step S17, and a determination is made whether the self node is AND condition. When the determination is made that the self node is the AND condition (Yes at step S17), Trans (AND) is created (step S18), and a link from Trans (AND) to Place_R is provided (step S19). Then, processing tables for respective child nodes are created (step S21), and a link from a return value Place_n to Trans (AND) is provided (step S22). The steps S21 to S22 are repeated until the respective child nodes are processed (Yes at step S20). When a determination is made that the respective child nodes are processed (Yes at step S20), the sequence goes to step S23, and Place_r is taken back.

When the determination is made that the self node is not the AND condition (No at step S17), Trans (CMB) is created (step S24), and a link from Trans (CMB) to Place_r is provided (step S25). Then, processing tables for child nodes are created (step S26), and after a link from a return value Place_n to Trans (CMB) is provided (step S27), the sequence goes to step S23 so that Place_r is taken back.

As mentioned above, the path pattern processing table 29 is created by recursively executing the process from the route nodes of the secondary structure graph.

The structure stream scanning unit 28 functions as a structure stream scanning means. The structure stream scanning unit 28 acquires the structure stream data aggregate from the structure stream data area 21b of the structured document DB 21, and collates the aggregates with the path pattern processing table 29 so as to create result data.

Figure 14:
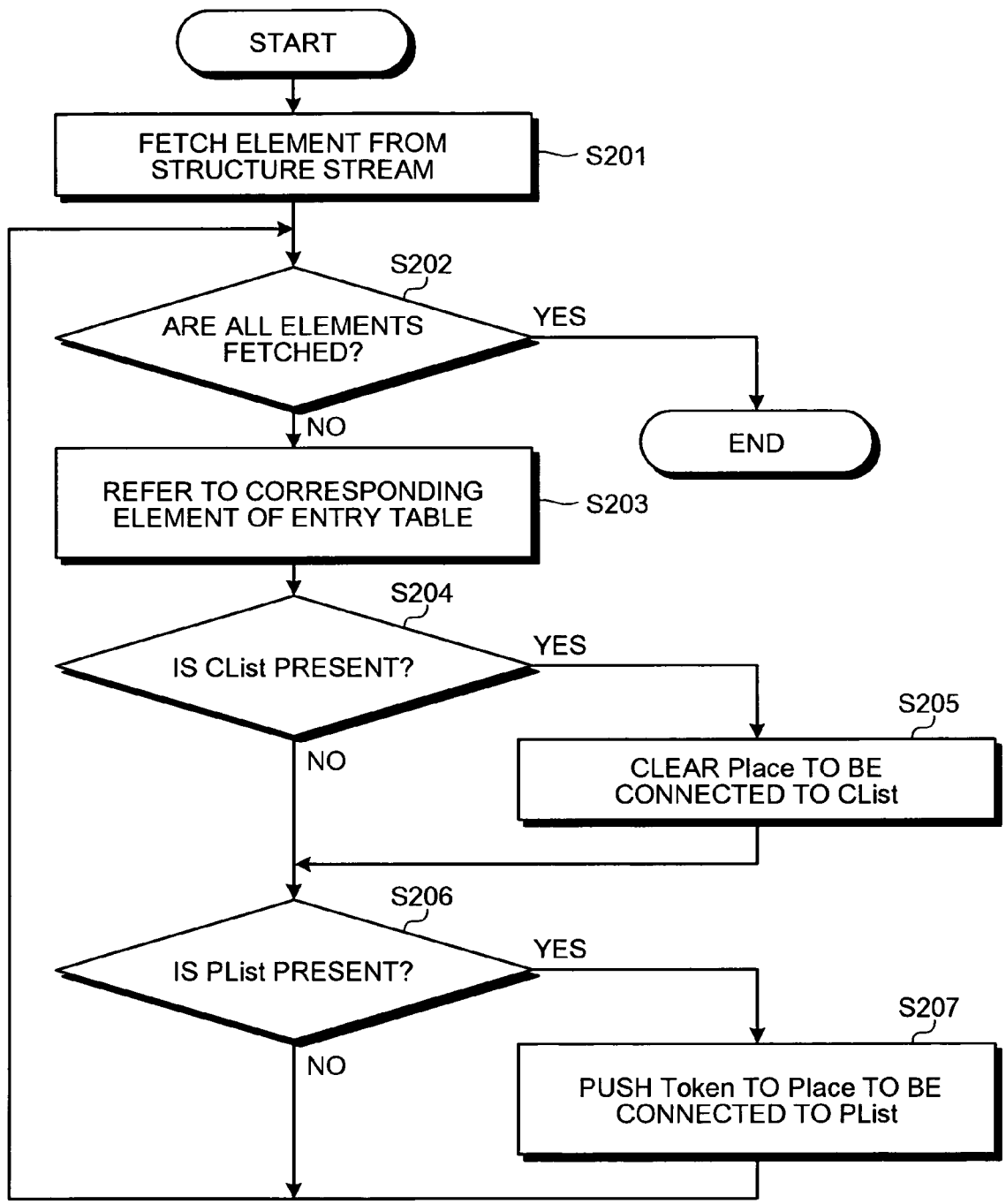
FIG. 14 is a flowchart is a flowchart illustrating a flow of a process for scanning a structure stream.
Figure 15:
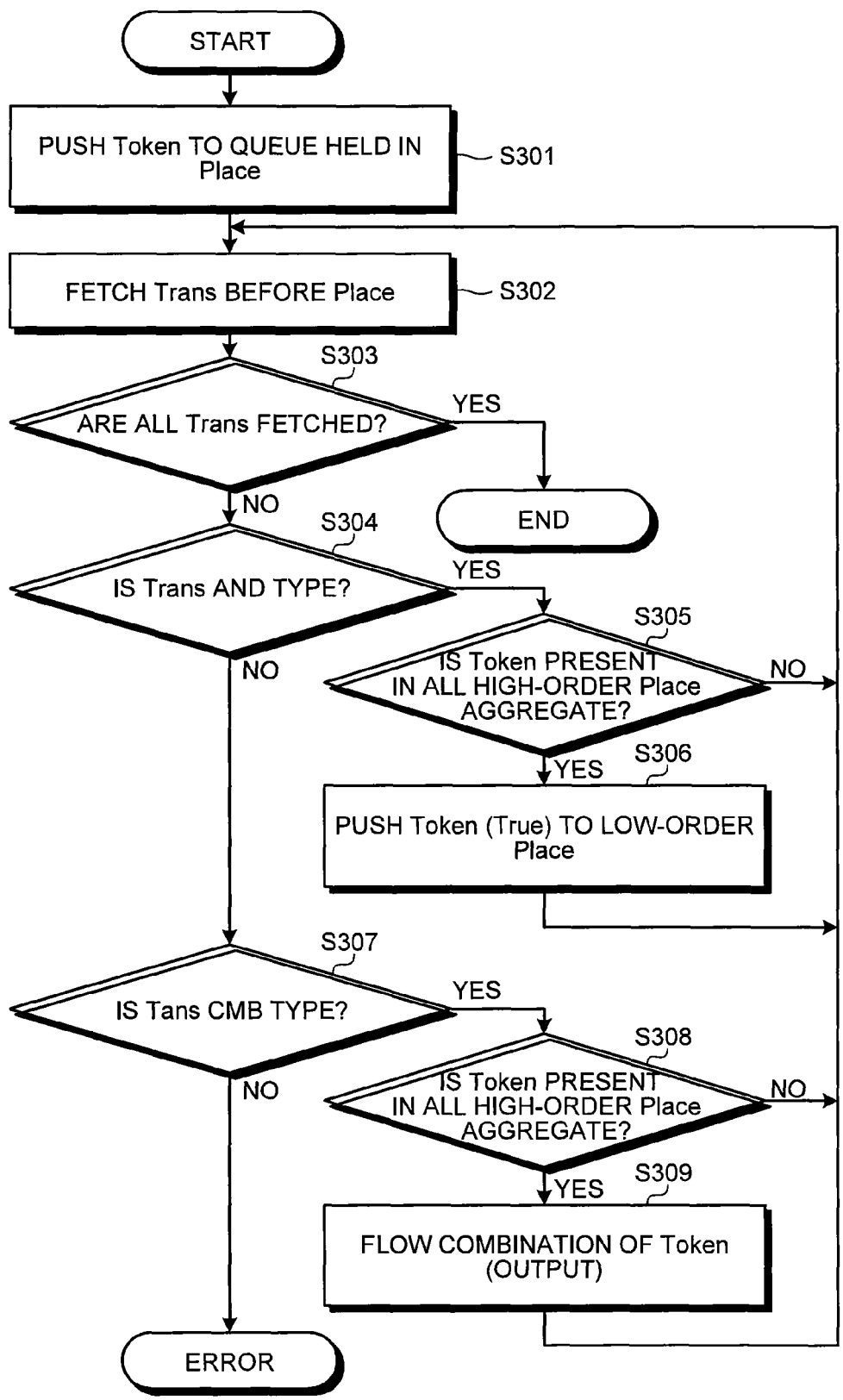
FIG. 15 is a flowchart illustrating a flow of a Token pushing process to Place.

The scanning process for the structure stream in the structure stream scanning unit 28 is explained with reference to flowcharts in FIGS. 14 and 15. As shown in FIG. 14, first, the elements of the structure stream are fetched sequentially (step S201), and the following processes (steps S203 to S207) are repeated until a determination is made whether all the elements are fetched (Yes at step S202). When the determination is made that all the elements are fetched (Yes at step S202), the structure stream scanning process is ended.

When the determination is made that not all the elements are fetched (No at step S202), entry table elements corresponding to the elements of the structure stream are referred to (step S203), and if CList is present (Yes at step S204), Place to be connected to CList is cleared (step S205). That is, queue held inside is emptied.

On the other hand, when PList is present (No at step S204, Yes at step S206), Token is pushed to Place to be connected to PList (step S207).

The process at step S207 is explained in detail with reference to FIG. 15. As to the pushing of Token to Place, first, Token is pushed to queue held in Place (step S301). Thereafter, Trans before Place is sequentially fetched (step S302), the following processes (steps S304 to S309) are repeated until a determination is made that all Trans are fetched. When the determination is made that all the Trans are fetched (Yes at step S303), the Pushing process for Token to Place is ended.

When the determination is made that not all the Trans are fetched (No at step S303), if Trans is AND type (Yes at step S304), a determination is made whether Token is present in all the high-order Place aggregates (step S305).

When the determination is made that Token is present in all the high-order Place aggregates (Yes at step S305), Token (true) is pushed to the low-order Place (step S306), and the sequence returns to step S302.

On the other hand, when Trans is CMB type, (No at step S304, Yes at step S307), a determination is made whether Token is present in all the high-order Place aggregates (step S308).

When the determination is made that Token is present in all the high-order Place aggregates (Yes at step S308), the combination of Token is output (step S309). On the other hand, when the determination is made that Token is present not all the high-order Place aggregates (Yes at step S308), the sequence returns to step S302.

When Trans is neither AND type nor CMB type (No at step S304, No at step S307), an error process is executed.

FIG. 16 is a progress chart when the structure stream data shown in FIG. 6 is given to the path pattern processing table 29 shown in FIG. 12.

When E0 [G0] is scanned,
since PList and CList are not present, nothing is executed.
When E1 [G1] is canned,
since PList and CList are not present, nothing is executed.
When E2 [G2] is scanned,
PList and CList are present. Place0 and Place1 are cleared, and Token2 is pushed to Place0. Since Place1 is empty, Trans0 outputs nothing.
. . .
. . .
When E6 [G6] is scanned,
PList is present. 6 is pushed to Place1. Since Token is in Place0 and Place1, Tarns0 outputs Token 2 of Place0 as an output node.
. . .
. . .
When E13 [G2] is scanned,
PList and CList are present. Place0 and Place1 are cleared, and Token 13 is pushed to Place0. Since Place1 is empty, Trans0 output nothing.
. . .
When E15 [G6} is scanned,
PList is present. 15 is pushed to Place1. Since Token is in Place0 and Place1, Trans0 outputs Token 13 of Place0 as an output node.
. . .

According to the above-mentioned process, Token 2 and Token 13 are output. 2 corresponds to E2 in FIGS. 4, and 13 corresponds to E13 in FIG. 4. Token 2 and Token 13 acquire text data stored in the text data area 21c of the structured document DB 21 using the search interface unit 26, and the text data are converted into character string as structured document data so as to be output as result data to the client terminal 3.

According to the embodiment, the structured document data are syntax-analyzed, and the structure information in the structured document data is converted into the structure stream data as one-dimensional sequence data by using the structure guide data so as to be stored. As a result, the structured document data can be compressed to about 1/20 even in the original document ratio, and the disc I/O can be reduced greatly so that the storage efficiency can be improved.

According to the present embodiment, the crucial basic operation is repeated without backtrack, and the overhead for the CPU process is small. As a result, the search process for the query data such as complicated XQuery and a plurality of XPaths, which are difficult to speed up, can be sped up significantly.

Second Embodiment

A second embodiment of the present invention is explained below with reference to FIGS. 17 to 21. The same members to those in the first embodiment are designated by the same numerals, and the explanation thereof is not repeated. In the second embodiment, the type of the query data is different from that in the first embodiment.

FIG. 17 is an explanatory diagram illustrating one example of query data Q2 of the second embodiment. FIG. 17 illustrates the following query data Q2.

Q2: The list of "book" of structured document data is returned. In the structured document data, the element "book" is present in a hierarchical tree of the structured document DB "ROOT", the element "author" is present in the "book", and two elements "first" and "last" are present in the element "author".

FIG. 18 is a schematic diagram illustrating a primary structure graph with respect to the query data Q2 of FIG. 17, and FIG. 19 is a schematic diagram illustrating secondary a structure graph based on the primary structure graph of FIG. 18.

As shown in FIG. 18, the primary structure graph with respect to the query data Q2 is provided with a condition such that the two elements "first" and "last" are provided below "author". For this reason, AND condition is provided to the link. When an unnecessary node is eliminated, the secondary structure graph shown in FIG. 19 is created.

Figure 20:
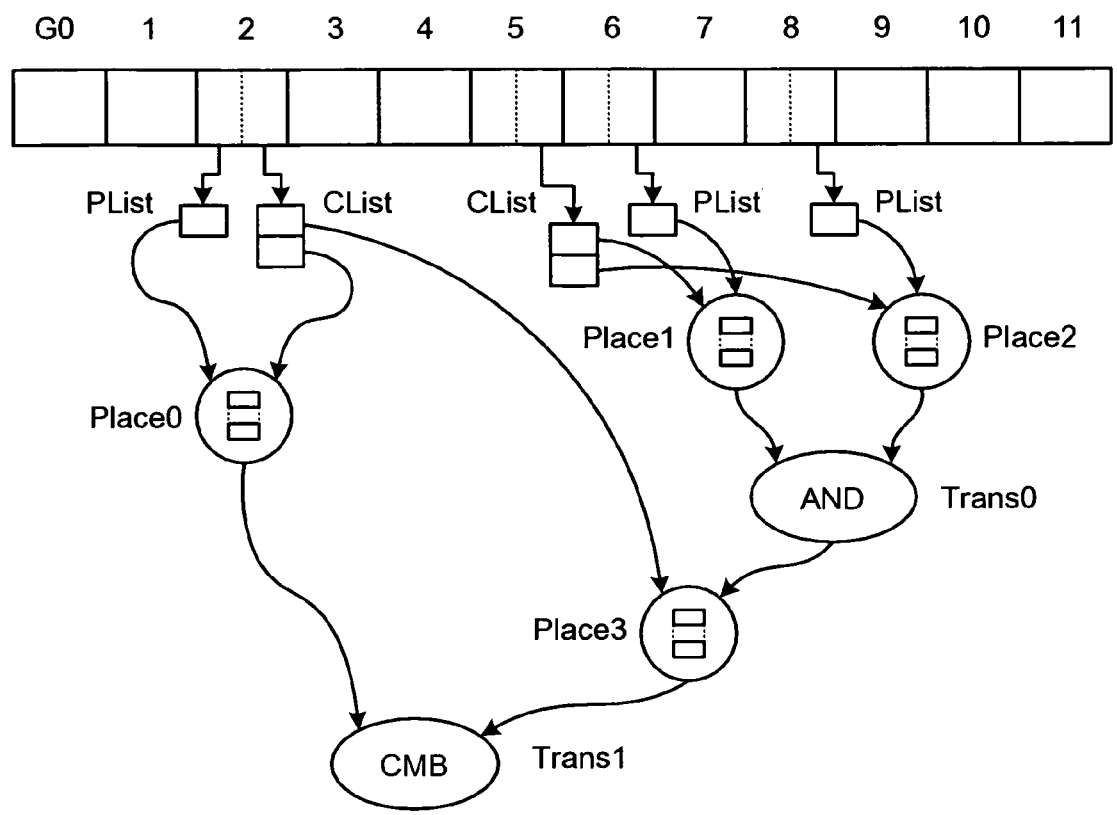
FIG. 20 is an explanatory diagram illustrating one example of a path pattern processing table for the query data Q2.

FIG. 20 is an explanatory diagram illustrating one example of the path pattern processing table 29 of the query data Q2 shown in FIG. 17. A difference from one example of the path pattern processing table 29 of the query data Q1 shown in FIG. 12 is that Trans (AND) is added.

FIG. 21 is a progress chart when the structure stream data shown in FIG. 6 are given to the path pattern processing table 29 shown in FIG. 20.

When E0 [G0] is scanned,
since PList and CList are not present, nothing is executed.
When E1 [G1] is scanned,
since PList and CList are not present, nothing is executed.
When E2 [G2] is scanned,
PList and CList are present. Place0 and Place3 are cleared, and Token2 is pushed to Place0. Since Place1 is empty, Trans1 outputs nothing.
...
...
When E5 [G5] is scanned,
CList is present. Place1 and Place2 are cleared.
When E6 [G6] is scanned,
PList is present. Token 6 is pushed to Place1. Since Place2 is empty, Tran0 outputs nothing.
...
When E8 [G5] is scanned,
PList and CList are present. Place1 and Place2 are cleared.
When E9 [G8] is scanned,
PList is present. Token 9 is pushed to Place2. Since Place1 is empty, Trans0 outputs nothing.
...
...
When E14 [G5] is scanned,
PList and CList are present. Place1 and Place2 are cleared.
When E15 [G6] is scanned,
PList is present. Token 15 is pushed to Place1. Since Place2 is empty, Trans0 outputs, nothing.
...
When E17 [G8] is scanned,
PList is present. Token 17 is pushed to Place2. Since Token is in Place1 and Place2, Trans0 pushes Token True to Place3. Since Token is in Place0 and Place3, Trans1 outputs Token 13 of Place0 corresponding to an output node.
...

According to the above-mentioned process, Token 13 is output. 13 corresponds to E13 in FIG. 4. Token 13 acquires text data stored in the text data area 21c of the structured document DB 21 using the search interface unit 26, and the text data are converted as the structured document data into character string. The character string is output as result data to the client terminal 3.

Compared with the structure stream data of FIG. 16 in the first embodiment, even the structure stream data are the same, if the path pattern processing tables are different from each other, different result data are obtained.

Third Embodiment

A third embodiment of the present invention is explained below with reference to FIG. 22. The same members to those in the first and second embodiments are designated by the same numerals, and the explanation thereof is not repeated. In the third embodiment, the query data Q1 of the first embodiment and the query data Q2 of the second embodiment are processed simultaneously.

FIG. 22 is an explanatory diagram illustrating one example of the path pattern processing table 29 for simultaneously processing the query data Q1 and Q2. This can be obtained by synthesizing the path pattern processing table 29 shown in FIG. 12 and the path pattern processing table 29 shown in FIG. 20. When the structure stream data shown in FIG. 6 is given to the path pattern processing table 29 shown in FIG. 22, the following outputs are obtained.

(1) Trans0_1 outputs Token 2 and Token 13.
(2) Tans1 outputs Token 13.

According to the third embodiment, in the case of not only simple XPath but also complicated XQuery, a plurality of result data can be simultaneously output by one-time scanning of the structure stream data. Further, when a plurality of XQuery are accepted, a plurality of result data can be simultaneously output by one-time scanning of the structure stream data.

Fourth Embodiment

A fourth embodiment of the present invention is explained below with reference to FIGS. 23 and 24. The same members to those in the first to third embodiments are designated by the same numerals, and the explanation thereof is not repeated.

In the fourth embodiment, when the structured document data accompany in advance structure information, namely, the structure information of the structured document data is clearly defined in advance, the path pattern compile unit 27 incorporates a procedure for skipping the scanning of the structured stream data. The fourth embodiment is a different from the first to third embodiments in this point.

FIG. 23 is an explanatory diagram illustrating one example of the structured document data accompanying in advance structure information. As shown in FIG. 23, as to the structured document data to be treated, its document structure can be defined in advance. A schema language enables this definition, and the basic one is DTD (Data Type Definition) for XML. DTD is composed of declaration aggregate such as element declaration, attribute declaration and entity declaration. In FIG. 23, the elements such as "books", "book", "info", "isbn", "issueDate", "year" "month" and "day" are declared.

"books" is composed of a plurality of "book"s and one "info". "+" means that repetition of one or more elements is permitted.

"info" is composed of "isbn" and "issueDate".

"issueDate" is composed of "year", "month" and "day".

When new structured document data are stored, validity with respect to DTD given in advance is checked, and when the structured document data do not match DTD, they are regarded as validity error so as not to be stored.

When DTD (structure information) is defined in advance for text data in the text data area 21c of the structured document DB 21, the path pattern compile unit 27 incorporates the procedure for skipping some of the structure stream data into the path pattern processing table 29, so that the scanning process in the structure stream scanning unit 28 can be sped up.

An example where the query data Q1 shown in FIG. 8 are processed with respect to the structured document data shown in FIG. 23 is shown below. The path pattern compile unit 27 to which the query data Q1 is given refers to DTD in FIG. 23 so as to calculate the elements composing "info". That is, the number of the elements is ten as follows.

(1) info
(2) isbn
(3) isbn text
(4) issueDate
(5) year
(6) year text
(7) month
(8) month text
(9) day
(10) day text These elements are reflected to the structure guide data area 21a of the structured document DB 21.

On the other hand, the secondary structure graph which corresponds to the query data Q1

//book [author [first] is, as shown in FIG. 11

2-6.

A portion tree of the corresponding structure guide data area 21a does not have a common portion to a portion tree of the structure guide data area 21a corresponding to (1) to (10).

As a result, the path pattern compile unit 27 determines that ten sequence elements can be skipped when reaching GID12 corresponding to "info". As shown in FIG. 24, the path pattern compile unit 27 sets the procedure for skipping ten elements of PList corresponding to GID12 in the path pattern processing table 29.

When the structure stream scanning unit 28 scans the GID12, it skips ten structure stream elements so as to continue the scanning process.

In the above example, the heightening of the speed using the advance structure information is explained, but the speed can be heightened similarly also by using the statistics information of the stored structured document data.

In the above example, the case where DTD is defined in advance is considered, but even if DTD is not defined in advance, the path pattern compile unit 27 can incorporate the procedure for skipping some of the structure stream data into the path pattern processing table 29 so as to execute the skipping procedure similarly as long as structure information after "info" appears in the structured document data. For this reason, the structure stream converting unit 25 may store the flag where the structure after "info" appears in all the structured document data in the structure guide data area 21a.

According to the fourth embodiment, since the structure stream can be reproduced halfway, unnecessary traverse can be skipped by using structure ID and statistics information (drawing schema and index).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A structured document management apparatus comprising:
   a document data accepting unit that accepts input of structured document data having a hierarchical logic structure;
   a structure guide data storage unit that stores structure guide data which is a summary of hierarchical structure information of the structured document, wherein the structure guide data contains a guide node where unique identification information is allocated;
   a structure stream converting unit that executes a syntax analysis of the structured document data, and converts the structured document data into structure stream data as one-dimensional sequence data by arranging the unique identification information of guide nodes corresponding to nodes that pass when depth-prioritized tracing is performed from a route node of the structured document data using the structured guide data;
   a structure stream data storage unit that stores the structure stream data;
   a query data accepting unit that accepts input of query data;
   a path pattern compile unit that creates a path pattern processing table which specifies a processing procedure specialized for the query data by
   executing a syntax analysis of the accepted query data and creating a primary structure graph in which a relationship between tags is expressed by a tree format, and
   collating the primary structure graph and the structured guide data, converting the primary structure graph and the structured guide data into the unique identification information, and creating a secondary structure graph where unnecessary nodes are removed, the path pattern processing table including:
   an Entry Table which has a sequence element corresponding to the unique identification information and executes a process corresponding to the unique identification information;
   a Place which is a storage area for holding a queue of Tokens as intermediate data, the Place representing a position of the unique identification information; and
   a Trans which connects one Place and another Place and flows a Token held at a high-order Place to a low-order Place,
   the path pattern processing table being created by
   pasting the process corresponding to the unique identification information of the Entry Table and linking the Place and the Trans recursively from the route node to a terminal node of the secondary structure graph; and
   a structure stream scanning unit that acquires the structure stream data from the structure stream data storage unit, and gives the structure stream to the path pattern processing table so as to execute the processing procedure.

2. The apparatus according to claim 1, wherein the path pattern compile unit synthesizes the path pattern processing tables relating to the respective query data so as to create a path pattern processing table of the plural query data when the plural query data are processed.

3. The apparatus according to claim 1, wherein the path pattern compile unit incorporates a procedure for skipping a portion of the structure stream data in the path pattern processing table when structure information of the structured document data is defined.

4. The apparatus according to claim 1, wherein the path pattern compile unit incorporates a procedure for skipping a portion of the structure stream data in the path pattern processing table when the structure information appears due to statistics information of the structured document data.

5. The apparatus according to claim 1, wherein the structure guide data hold the following conditions (1) to (3):
   (1) all paths that appear in the structured document data appear in the structure guide data;
   (2) all paths that appears in the structure guide data appear in the structured document data; and
   (3) all paths which appear in the structure guide data are unique.

6. A computer program product having a computer readable storage medium including programmed instructions for managing a structured document, wherein the instructions, when executed by a computer, cause the computer to perform:

accepting input of structured document data having a hierarchical logic structure;

executing a syntax analysis of the structured document data, and converting the structured document data into structure stream data as one-dimensional sequence data by arranging unique identification information which is a summary of hierarchical structure information of the structured document data, wherein the unique identification information of the guide nodes corresponds to nodes that pass when depth-prioritized tracing is performed from a route node of the structured document data using the structured guide data, and the structured guide data contains a guide node where the unique identification information is allocated;

storing the structure stream data in a structure stream data storage unit;

accepting input of query data;

creating a path pattern processing table which specifies a processing procedure specialized for the query data by executing a syntax analysis of the accepted query data and creating a primary structure graph in which a relationship between tags is expressed by a tree format, and collating the primary structure graph and the structured guide data, converting the primary structure graph and the structured guide data into the unique identification information, and creating a secondary structure graph where unnecessary nodes are removed, the path pattern processing table including:

an Entry Table which has a sequence element corresponding to the unique identification information and executes a process corresponding to the unique identification information;

a Place which is a storage area for holding a queue of Tokens as intermediate data, the Place representing a position of the unique identification information; and a Trans which connects one Place and another Place and flows a Token held at a high-order Place to a low-order Place, the path pattern processing table being created by pasting the process corresponding to the unique identification information of the Entry Table and linking the Place and the Trans recursively from the route node to a terminal node of the secondary structure graph; and acquiring the structure stream data from the structure stream data storage unit and giving the structure stream to the path pattern processing table so as to execute the processing procedure.

7. The computer program product according to claim 6, wherein the path pattern processing tables relating to the respective query data are synthesized so as to create a path pattern processing table of the plural query data when the plural query data are processed.

8. The computer program product according to claim 6, wherein a procedure for skipping a portion of the structure stream data is incorporated in the path pattern processing table when structure information of the structured document data is defined.

9. The computer program product according to claim 6, wherein a procedure for skipping a portion of the structure stream data is incorporated in the path pattern processing table when the structure information appears due to statistics information of the structured document data.

10. A method of managing structured document comprising:

accepting input of structured document data having a hierarchical logic structure;

executing a syntax analysis of the structured document data, and converting structure information in the structured document data into structure stream data as one-dimensional sequence data by arranging unique identification information which is a summary of hierarchical structure information of the structured document data, wherein the unique identification information of guide nodes corresponds to nodes that pass when depth-prioritized tracing is performed from a route node of the structured document data using the structured guide data, the structured guide data contains a guide node where the unique identification information is allocated;

storing the structure stream data in a structure stream data storage unit;

accepting input of query data;

creating a path pattern processing table which specifies a processing procedure specialized for the query data by executing a syntax analysis of the accepted query data and creating a primary structure graph in which a relationship between tags is expressed by a tree format, and collating the primary structure graph and the structured guide data, converting the primary structure graph and the structured guide data into the unique identification information, and creating a secondary structure graph where unnecessary nodes are removed, the path pattern processing table including:

an Entry Table which has a sequence element corresponding to the unique identification information and executes a process corresponding to the unique identification information;

a Place which is a storage area for holding a queue of Tokens as intermediate data, the Place representing a position of the unique identification information; and a Trans which connects one Place and another Place and flows a Token held at a high-order Place to a low-order Place, the path pattern processing table being created by pasting the process corresponding to the unique identification information of the Entry Table and linking the Place and the Trans recursively from the route node to a terminal node of the secondary structure graph; and acquiring the structure stream data from the structure stream data storage unit and giving the structure stream to the path pattern processing table so as to execute the processing procedure.

11. The method according to claim 10, wherein the path pattern processing tables relating to the respective query data are synthesized so as to create a path pattern processing table of the plural query data when the plural query data are processed.

12. The method according to claim 10, wherein a procedure for skipping a portion of the structure stream data is incorporated in the path pattern processing table when structure information of the structured document data is defined.

13. The method according to claim 10, wherein a procedure for skipping a portion of the structure stream data is incorporated in the path pattern processing table when the structure information appears due to statistics information of the structured document data.

* * * * *